United States Patent [19]
Duncan

[11] Patent Number: 5,848,715
[45] Date of Patent: *Dec. 15, 1998

[54] COMBINATION ROLL BAR AND CRANE

[76] Inventor: Malcolm Duncan, Box 400, Marisburg 1700, South Africa

[ * ] Notice: The term of this patent shall not extend beyond the expiration date of Pat. No. 5,730,304.

[21] Appl. No.: 742,039

[22] Filed: Nov. 1, 1996

[30] Foreign Application Priority Data

Jun. 6, 1996 [ZA] South Africa .............................. 960508
Jun. 6, 1996 [ZA] South Africa .............................. 964708

[51] Int. Cl.⁶ .................................................. B60R 21/13
[52] U.S. Cl. .......................... 212/180; 212/299; 212/253; 280/756; 414/914
[58] Field of Search ........................... 414/914; 280/756; 296/102; 212/175, 177, 253, 292, 299, 300, 180

[56] References Cited

U.S. PATENT DOCUMENTS

| | | | |
|---|---|---|---|
| 1,111,416 | 9/1914 | Taylor | 212/253 |
| 1,817,392 | 8/1931 | Ohlinger . | |
| 2,557,466 | 6/1951 | Richards et al. . | |
| 2,704,615 | 3/1955 | Stokes et al. | 414/914 |
| 2,906,501 | 9/1959 | Brell | 212/292 |
| 3,215,294 | 11/1965 | Salamin . | |
| 3,216,588 | 11/1965 | Sundin | 212/292 |
| 3,306,625 | 2/1967 | Ottosson | 296/102 |
| 3,802,720 | 4/1974 | Ellis . | |
| 3,804,263 | 4/1974 | Castonguay . | |
| 3,952,893 | 4/1976 | Kolesar . | |
| 4,034,879 | 7/1977 | Cudmore . | |
| 4,136,985 | 1/1979 | Taul | 280/756 |
| 4,139,110 | 2/1979 | Roberts . | |
| 4,383,791 | 5/1983 | King . | |
| 4,556,358 | 12/1985 | Harlan . | |
| 4,596,336 | 6/1986 | Zwagerman . | |
| 4,659,276 | 4/1987 | Billett | 212/300 |
| 5,014,863 | 5/1991 | Vlaanden . | |
| 5,393,194 | 2/1995 | Smith . | |
| 5,431,526 | 7/1995 | Peterson et al. . | |
| 5,487,478 | 1/1996 | Morrow | 212/253 |

FOREIGN PATENT DOCUMENTS

| | | |
|---|---|---|
| 524066 | 8/1921 | France . |
| 31636 | 9/1963 | Germany . |
| V10642 | 6/1995 | South Africa . |
| V10785 | 8/1995 | South Africa . |

OTHER PUBLICATIONS

"Marlim Rollbar Crane" Sales literature.

Primary Examiner—Thomas J. Brahan
Attorney, Agent, or Firm—George Pappas

[57] ABSTRACT

A roll bar and crane device for use with vehicles such as a truck is adapted to be mounted to the truck bed. The device includes left and right leg members and a central beam extending therebetween and being selectively detachable thereto. A U-shaped boom extends over the left and right leg members when used as a roll bar. The boom, at one end, is pivotally connected to a pivot member about a horizontal axis of rotation and the pivot member is pivotally connected to one of the leg members and is pivotable about a vertical axis of rotation. A hydraulic jack selectively lifts and lowers the boom when used as a crane. Covers are provided on the boom left and right legs and hide from plain view working components including the hydraulic jack.

13 Claims, 15 Drawing Sheets

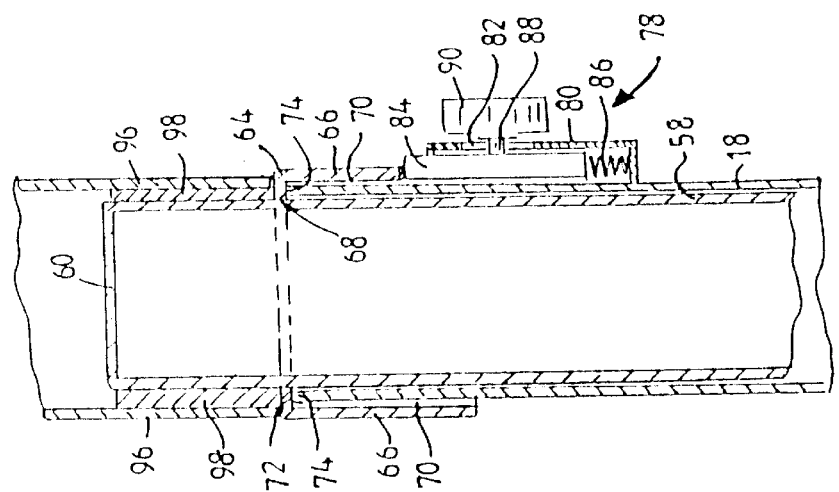
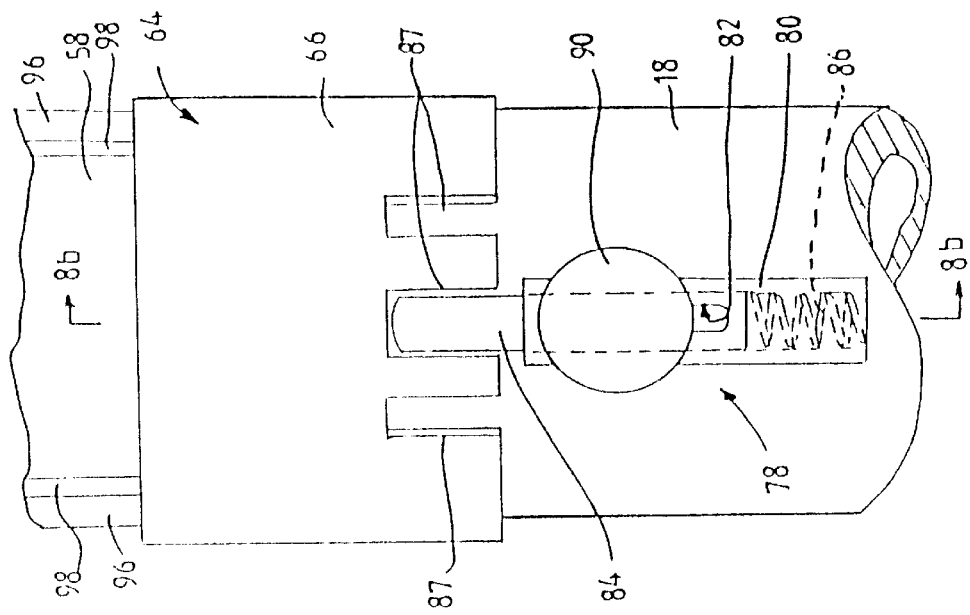
FIGURE 8b
FIGURE 8a

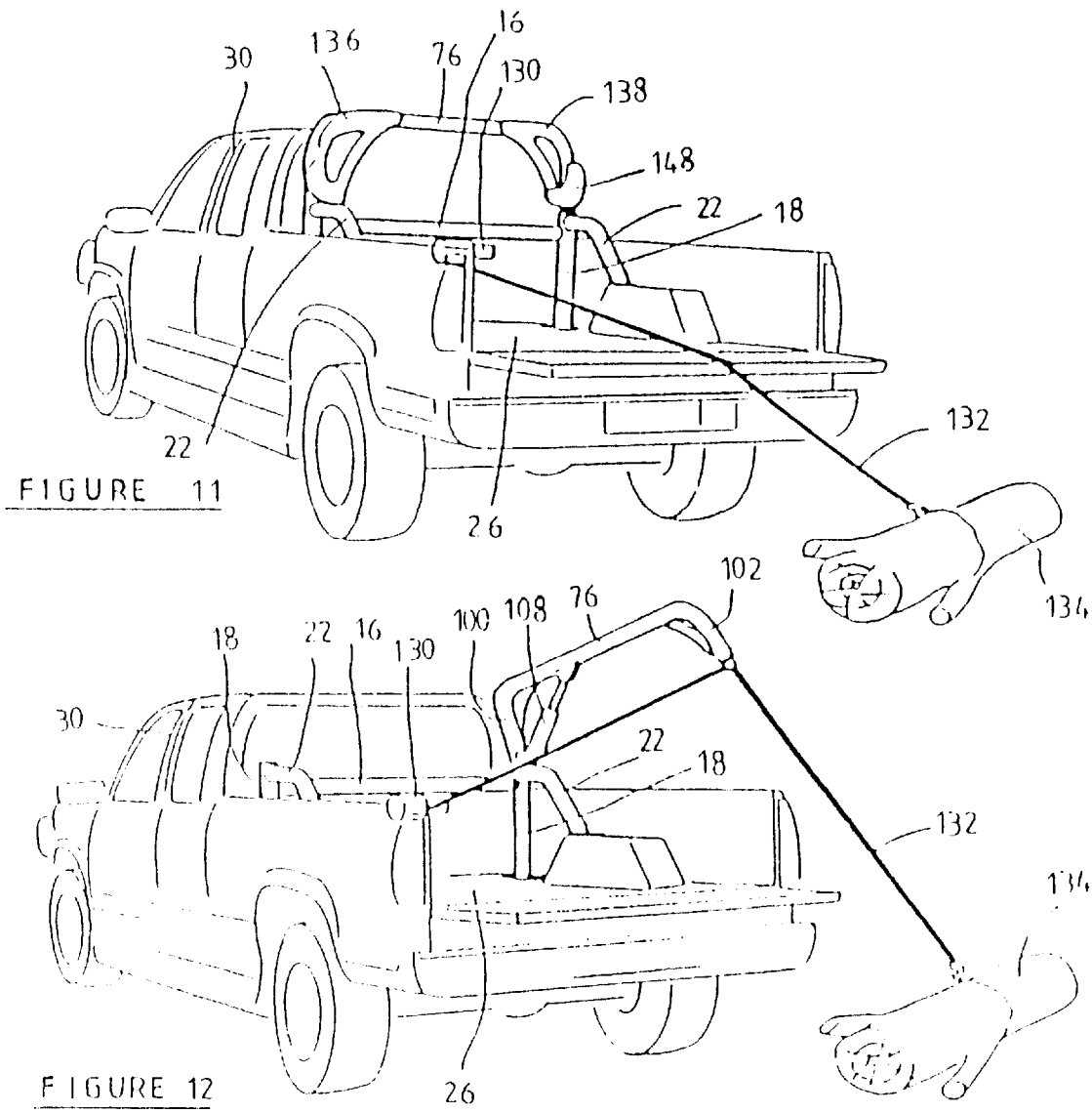

COMBINATION ROLL BAR AND CRANE

TECHNICAL FIELD

The device of the present invention generally relates to roll bars which are primarily used on vehicles such as pickup trucks. More particularly, the device of the present invention relates to a new and improved roll bar for vehicles such as pickup trucks which also functions as a crane and which is dismantleable for easy transport, is aesthetically pleasing and is constructed so as to be substantially stable and safely operable.

BACKGROUND OF THE INVENTION

Roll bars are very commonly currently used in conjunction with various vehicles and especially trucks such as pickup trucks. The roll bars are mounted close to the passenger cab and function to help prevent the crushing of the cab in the event the truck is accidentally overturned or rolled over.

More recently, roll bars have been constructed in a manner whereby they also function as a crane for selectively lifting and moving objects on and off the truck bed. In one such prior roll bar and crane device, the upper horizontal tube of the roll bar is, at one end, pivotally connected so as to turn about a vertical axis and, at its other end, is selectively detachable from the roll bar lower portion. A hydraulic cylinder is also provided and is pivotally connected to the horizontal member near the pivotable connection for selectively raising and lowering the horizontal member. Thus, the roll bar upper horizontal member is selectively pivotable about a vertical axis and is also selectively pivotable and movable vertically in a manner whereby various objects can be selectively attached at the other end of the horizontal member and selectively lifted and moved on and off the truck bed.

The roll bar and crane devices of the past however have shortcomings and drawbacks. These roll bar and crane devices are not aesthetically pleasing and, therefore, are undesirable by many typical consumers. They are also very large and bulky and are very difficult to transport to the consumer for attachment to a vehicle or truck. Prior roll bar and crane devices are also structurally inferior and are not readily, easily or safely usable as a crane.

Accordingly, a need exists for roll bar crane device which is aesthetically pleasing, easily transportable and which can be easily, readily and safely used as both a roll bar and a crane.

SUMMARY OF THE INVENTION

It is the principal object of the present invention to overcome the above-discussed disadvantages associated with prior roll bar and crane devices.

Another object of the present invention is to provide a new and improved roll bar and crane which is selectively dismantleable so that it may be easily packaged and transported and selectively re-assembled on a vehicle such as a truck.

A further object of the present invention is to provide a new and improved roll bar and crane device which is aesthetically pleasing and desirable.

A yet a further object of the present invention is to provide a new and improved roll bar and crane device which is structurally reliable and which is easily, readily and safely usable.

The present invention is directed to a new and improved roll bar and crane device including a left leg member and a right leg member both which are adapted for attachment to the vehicle or truck bed. A central beam extends between and is connected to both the left and right leg members. A boom beam or section is generally U-shaped and, in its storage position, is connected to both the left and right leg members, extending upwardly therefrom and functioning as a common roll bar. The boom is pivotally connected at one of its ends to a pivot member and the pivot member is pivotally or rotatably connected to one of the leg members in a manner whereby the boom is selectively pivotable about a vertical axis of rotation. A hydraulic cylinder is provided and is pivotally connected between the pivot member and the boom. Accordingly, by selectively extending and retracting the hydraulic cylinder, the boom is also selectively pivotable about a horizontal axis of rotation.

The roll bar and crane device is selectively dismantleable for easy transport. In this regard, the boom is selectively detachable from the pivot member and both of the left and right leg members. The pivot member is also selectively detachable from the leg members. Further, the central beam is detachably attachable to the left and right leg members.

The boom member or beam is shaped and sized so as to preferably not exceed or extend beyond the overall shape of the vehicle cab as viewed from the vehicle front or back. Additionally, cover members are provided at each end of the boom so as effectively hide or disguise from plain view the hydraulic cylinder and other working components which are used when the device is in the crane mode. The cover members can be made of materials such as wood, polyurethane or plastic and are attached to the boom at each leg of the U-shape at least on one side of the boom and preferably, facing the back of the vehicle and placing the boom between the cover members and the vehicle cab. In another preferred embodiment, at least two cover members are provided at each end of the boom or legs in a manner whereby the boom legs are sandwiched therebetween.

The pivot member includes a cap having a cylindrical portion adapted to extend over and receive the upper portion of the left or right leg members. An inner tube having a outer diameter slightly smaller than the inner diameter of the leg member is adapted to be, at least in part, received within the leg member and extend up and through the cap. The cap cylindrical portion and inner tube thereby effectively radially sandwich the upper portion of the leg member therebetween. A pair gusset members are attached to the cap and the inner tube portion extending up and out of the cap. The boom beam or member is pivotally attached to the gusset members. The hydraulic cylinder or hydraulic extension member is pivotally attached to the gusset members at one end and to the boom at its other end.

A locking mechanism is provided at the upper portion of the leg member adjacent the pivot member for selectively locking and preventing horizontal motion of the boom about the vertical axis. The locking mechanism preferably includes a selectively retractable tongue located on the leg member and adapted to be selectively received within one of a plurality of slots on the pivot member cap. A retaining pin is further provided on the leg member and operates in conjunction with the inner tube of the pivot member for allowing pivotable motion of the pivot member but preventing the longitudinal extraction thereof from the leg member.

A manually or electrically operable winch may be provided with the roll bar and crane device and may be selectively attachable preferably either to the boom or the central beam.

In one form thereof, the present invention is directed to a roll bar and crane device including a right leg member selectively attachable to a vehicle and a left leg member selectively attachable to the vehicle. A central beam extends between the left and right leg members and is selectively detachably attachable to each of the left and right leg members. A U-shaped boom member is provided wherein when the device is in a roll bar position, the boom extends over and is coupled at one end to the right leg member and is coupled at its other end to the left leg member. The boom, at one end thereof, is pivotally attached to one of the left or right leg members and, at its other end, is selectively detachably attachable to the other of the left or right leg members. Accordingly, the boom is selectively pivotable about both a vertical axis of rotation and a horizontal axis of rotation for operating as a crane.

In one form thereof the present invention is directed to a roll bar and crane device including a right leg member selectively attachable to a vehicle and a left leg member selectively attachable to the vehicle. A central beam extends between the left and right leg members. A U-shaped boom member is provided. A pivot member having a portion pivotally coupled to one of the left or right leg members is provided and is adapted to pivot about a vertical axis of rotation. The boom is pivotally coupled to the pivot member for pivotal motion about a horizontal axis of rotation. When the devices is in a roll bar position the boom extends over the left and right leg members. The boom is selectively pivotable about both the vertical axis of rotation and the horizontal axis of rotation for operating as a crane.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 8a is a partial side elevation view of the roll bar and crane device shown in FIG. 3 and depicting the pivot member and cap along with the locking mechanism for selectively locking and preventing movement of the boom about the vertical axis;

FIG. 8b is a cross-sectional view of the portion of the device shown in FIG. 8a taken along line 8b—8b;

FIG. 11 is a perspective view of the roll bar and crane device shown in FIG. 1 mounted on a vehicle and wherein a winch is provided on the central beam and shown being used for moving a log;

FIG. 12 is a perspective elevation view similar to FIG. 11 but wherein the device has been placed in the crane position and the winch rope extends through the crane eyelet;

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAIL DESCRIPTION OF SPECIFIC EMBODIMENTS

Figure 1:
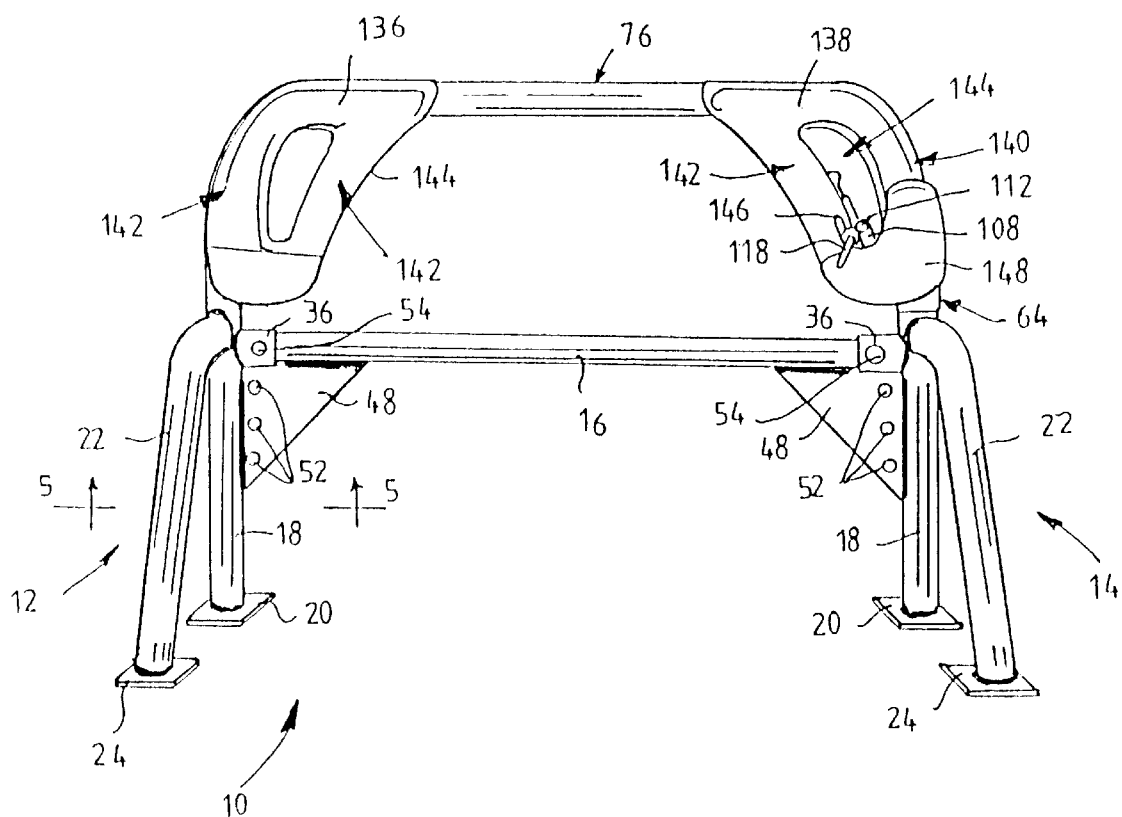
FIG. 1 is a tear elevation view of a roll bar and crane device constructed in accordance with the principles of the present invention and shown as would typically be seen from a rear of a vehicle upon which the device is adapted to be used.

Referring initially to FIG. 1, a roll bar and crane device is generally designated by the numeral 10 and is illustrated and shown fully assembled and in the roll bar position. The device 10 includes a left leg member 12 and a right leg member 14 separated by a central beam 16 extending therebetween. Each of the left and right leg members 12 and 14 include a vertical leg 18 with a pad or foot 20 at the lower end thereof. Each of the left and right leg members 12 and 14 also include a bracing leg 22 which, at their upper ends are affixed to the upper ends of vertical legs 18 and at their lower ends include a pad or foot 24.

Figure 3:
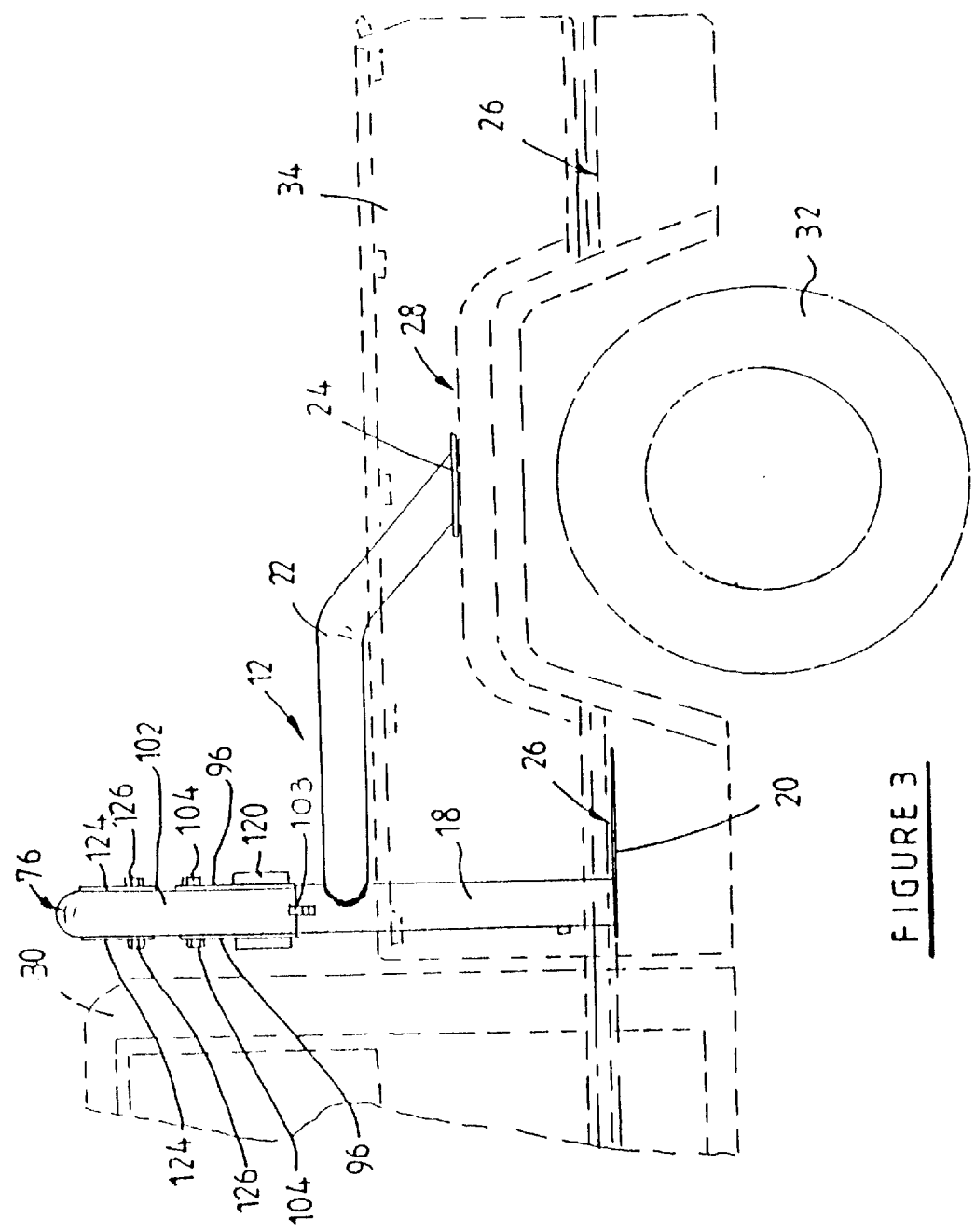
FIG. 3 is a side elevation view of the roll bar and crane device shown in FIG. 1 but with a modified leg structure and without any cover members thereon.

Both vertical legs 18 and bracing legs 22 are made of steel tubular sections which are cut to length and bent as may be needed. The bracing legs 22 are affixed to the vertical legs 18 by welding as shown or with other suitable means. Pads 20 and 24 are preferably cut from plate steel material and are welded or otherwise affixed by suitable means to the respective lower ends of vertical legs 18 and bracing legs 24. Pads 20 and 24 are provided with holes (not shown) or other means by which they may be ridgedly affixed to a vehicle bed 26 and/or a vehicle wheel well 28 as, for example, shown in FIG. 3. It is noted that in FIG. 3 a typical vehicle such as a pickup truck is shown in double-single dash lines including a cab 30, wheels 32, pickup bed walls 34 along with the pickup bed 26 and wheel wells 28.

Figure 2:
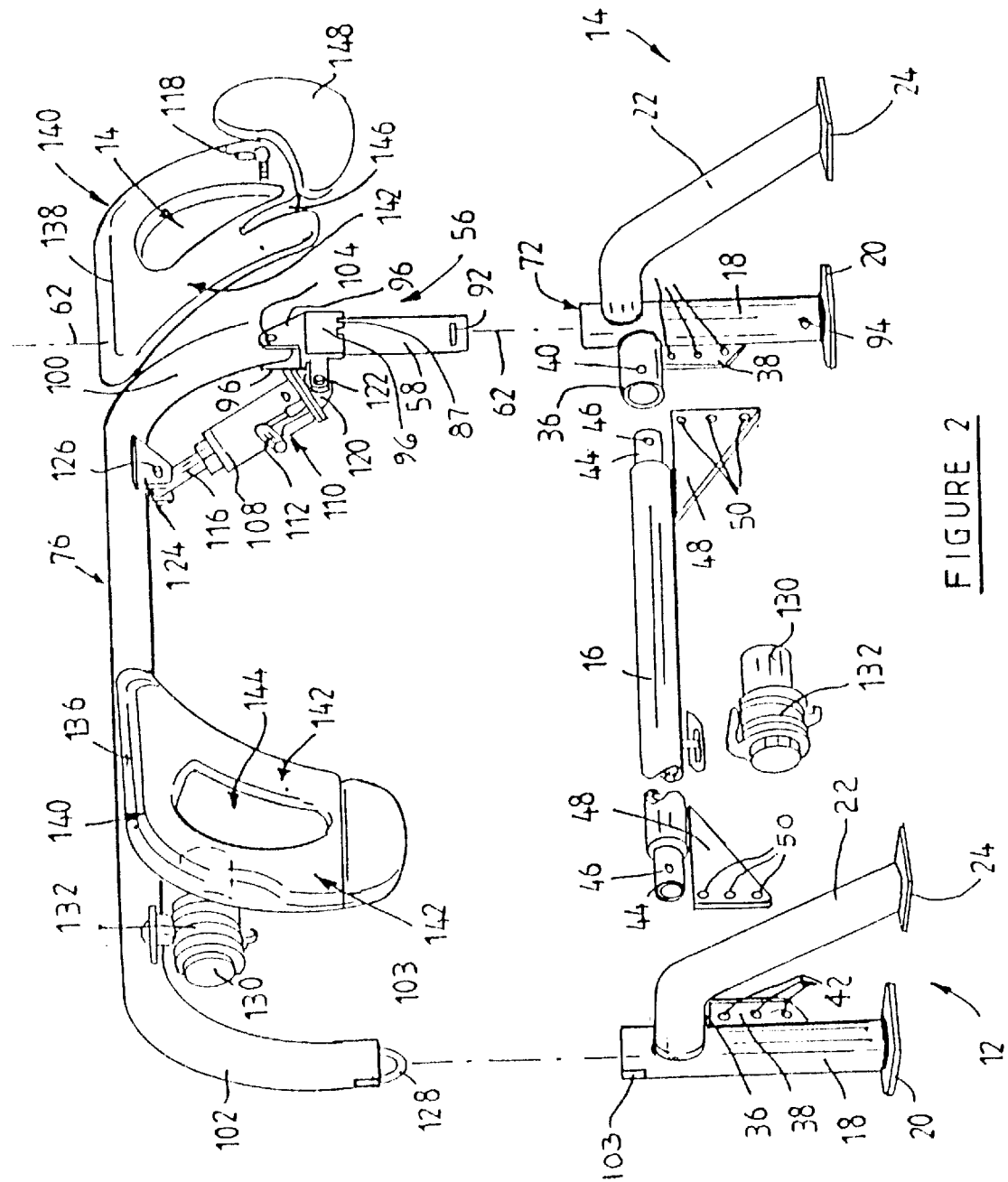
FIG. 2 is an exploded perspective view of the roll bar and crane device shown in FIG. 1 and showing the device as would be selectively dismantleable.
Figure 5:
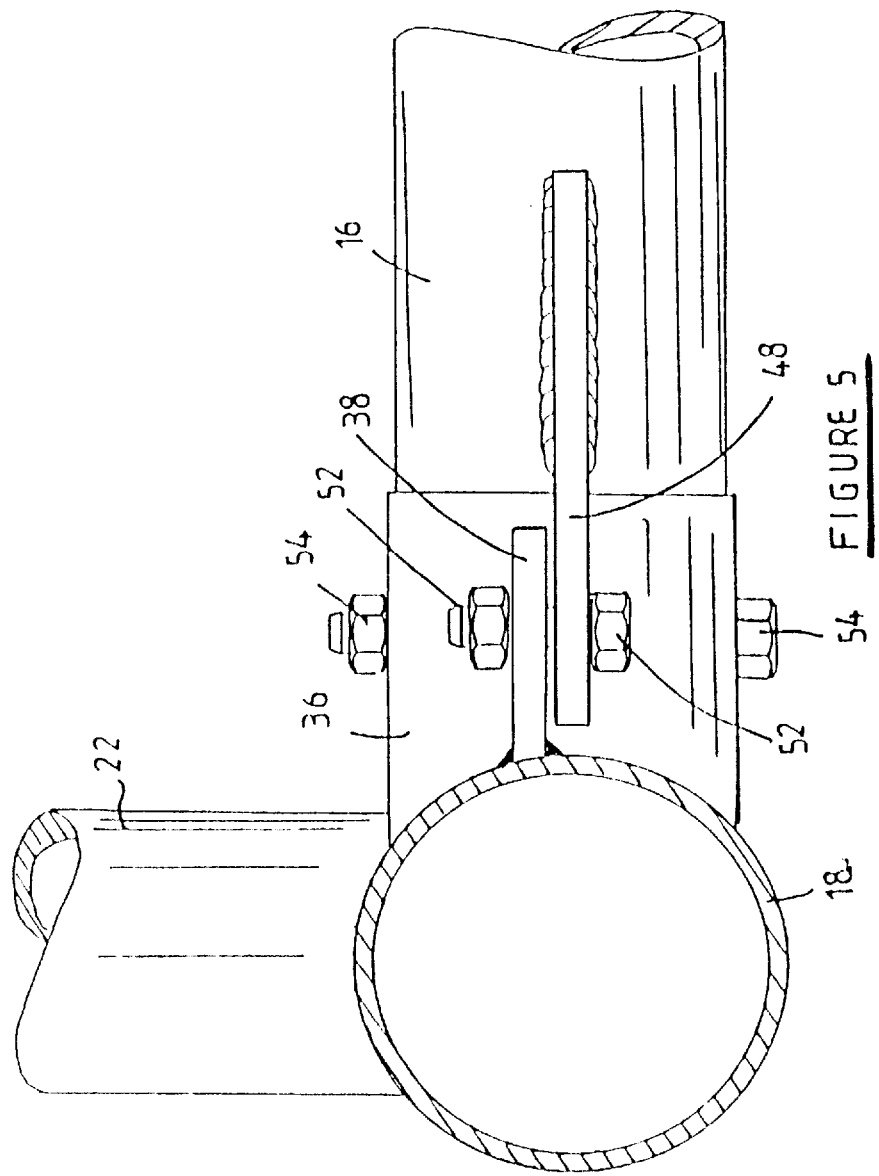
FIG. 5 is a partial cross-sectional view of the roll bar and crane device shown in FIG. 1 taken along line 5—5.

As best seen in FIG. 2, left and right leg members 12 and 14 are each further provided with cylindrical connecting members 36. Cylindrical connecting members 36 are also made of steel tube material and are affixed as shown generally to the upper portion of each of the vertical leg members 18 in a position which is generally perpendicular to or 90 degrees from the bracing legs 22. Below cylindrical connecting members 36, each of the left and right leg members 12 and 14 are provided with leg attachment plates 38 preferably made of plate steel. At each of the left and right legs 12 and 14, the leg attachment plates are affixed by welding or other suitable means to the cylindrical connecting member 36. The cylindrical connecting members 36 and leg attachment plates 38 are also affixed to the vertical legs 22 by welding or other suitable means. It is noted that, as best seen in FIG. 5, the leg attachment plates 38 are located slightly to the left or right of a plane extending centrally through both the cylindrical connecting member 36 and vertical legs 18. Holes 40 are provided and extend through cylindrical connecting members 36 and holes 42 are provided and extend through the leg attachment plates 38.

Similar to the leg members 12 and 14, central beam 16 is made of steel tube material having a sufficient diameter and thickness and being cut to the proper length. At each end of the central beam 16, reduced diameter portions 44 are provided having an outer diameter slightly smaller than the inner diameter of cylindrical connecting members 36 and, further, having a longitudinal length which is adapted to be substantially totally received within the cylindrical connecting members 36. Holes 46 are also provided on the reduced diameter portion 44 and are located such that when the reduced diameter portions 44 are fully received within the cylindrical connecting members 36, holes 44 and holes 40 become aligned with respect one another.

At each end of central beam 16, there are also provided ear brace members 48 which are made of plate steel material and which are generally triangularly shaped. Ear brace members 48 are affixed to the central beam 16 along a portion of one leg of the triangularly shape thereof as shown by welding or other suitable means. Along the other leg of the ear brace member 48 triangularly shape, a plurality of holes 50 are provided and are located such that when the reduced diameter portions 44 are fully received within the cylindrical connecting members 36, the respective plates 48 are located adjacent the leg attachment plates 38 as shown in FIG. 5 and, further, the holes 50 of ear brace members 48 are aligned with the holes 42 of leg attachment plates 38.

As can now be appreciated, the central beam 16 is selectively detachably attachable to the left and right leg members 12 and 14. Furthermore, for attachment of the central beam 16 to the respective left and right leg members 12 and 14, the respective ends of the central beam 16 are joined with the respective left and right leg members 12 and 14 by placing the reduced diameter portions 44 within the cylindrical connecting members 36 and the ear brace members 48 adjacent the leg attachment plates 38. In this position, the leg members 12 and 14 are secured to the central beam 16 with bolt and nut combinations 52 received through aligned holes 42 and 50 and nut bolt combinations 54 received through aligned holes 40 and 46. It is noted that, similar to leg attachment plates 38, the ear brace members 48 are located slightly to the left or right of a plane extending centrally along both the cylindrical connecting members 36 and vertical legs 18.

Although bracing legs 22 are shown in the drawings as being welded to the vertical legs 18, it is contemplated that in a preferred embodiment the bracing legs 22 are also selectively detachably attachable to the vertical legs 18 so that different size and shape bracing legs 22 can be selectively provided and used for adapting the device 10 to be used with various different vehicles and truck beds. The innerconnection between bracing legs 22 and vertical legs 18 can be similar to the innerconnection between central beam 16 and vertical legs 18 or, in the alternative, the innerconnection between bracing legs 22 and vertical legs 18 can be made only with, for example, a cylindrical connecting member or a sleeve like member 36 and without attachment plates and ear brace members.

Figure 6:
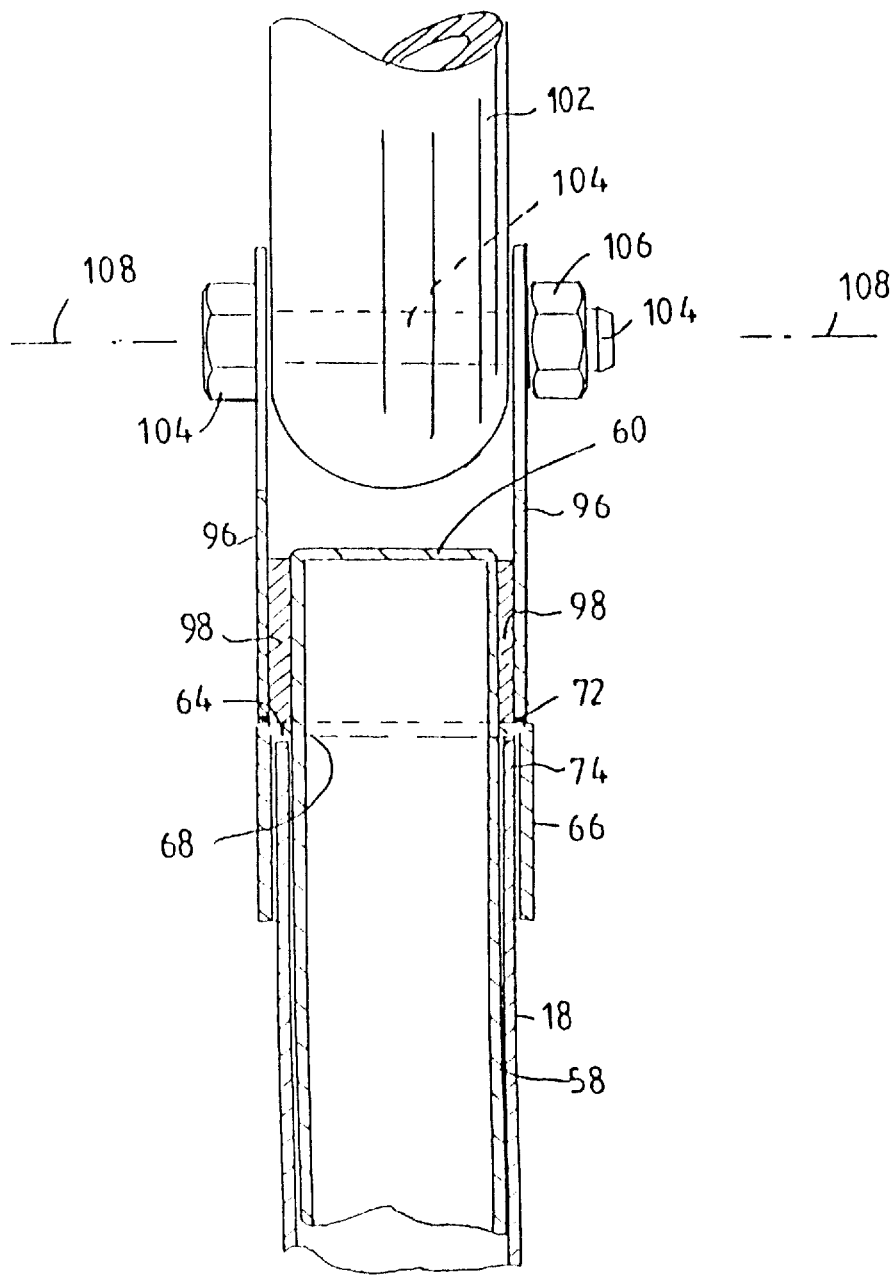
FIG. 6 is a partial-cross-sectional view of the roll bar and crane device shown in FIG. 4 taken along line 6—6.
Figure 7:
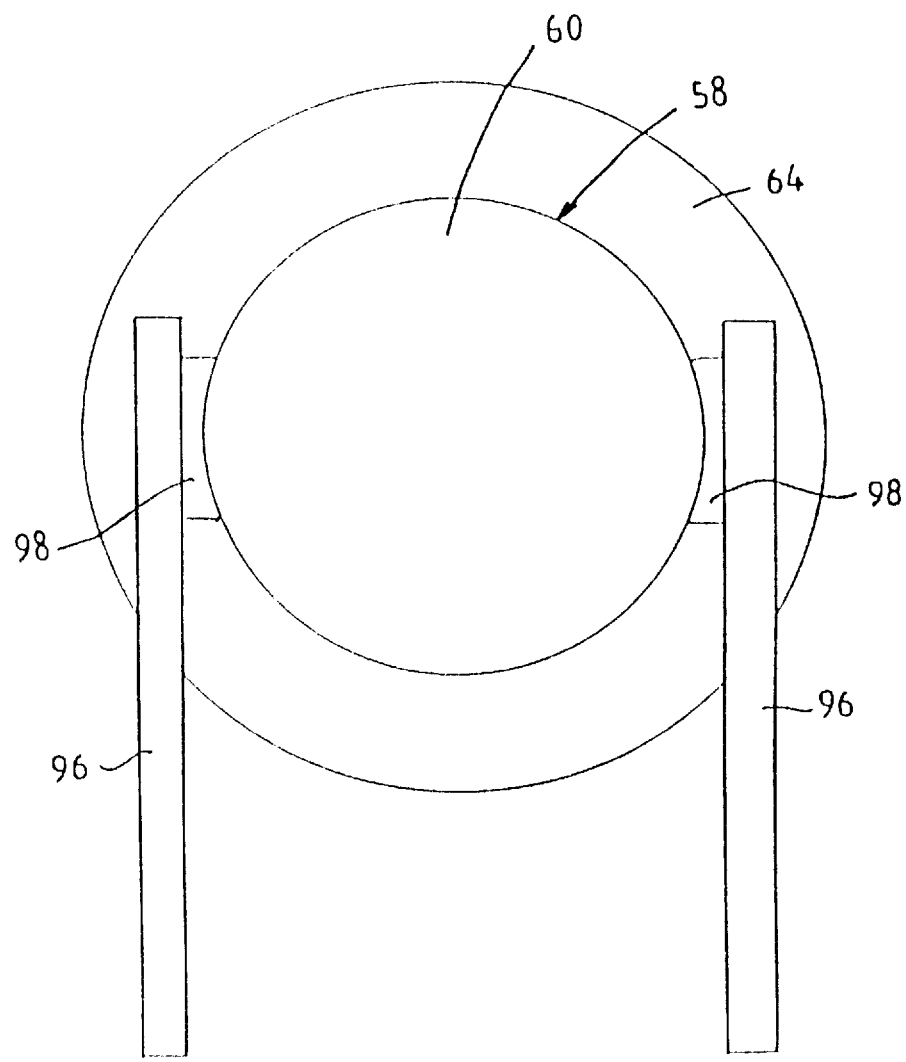
FIG. 7 is a top plan view of the pivot member shown in FIG. 6 without the boom.

Referring now more particularly to FIGS. 2, 4 and 6–8b, the preferred roll bar and crane device includes a pivot member generally designated by the numeral 56. Pivot member 56 includes inner tube section 58 also made of steel tubular material and cut to length. At its upper end, inner tube section 58 is closed with a disk portion 60. As best seen in FIGS. 6 and 8b, inner tube member 58 has an outer diameter which is slightly smaller than the inner diameter of a vertical leg 18 of a left or right leg member 12 or 14. Accordingly, inner tube member 58 is freely rotatable about a vertical axis 62 within the vertical leg 18.

At the upper end of pivot member 56 there is also provided a cap 64 including a cylindrical portion 66. Cap 64 is provided with a hole 68 through which the inner tube section 58 extends therethrough. Cap 64 is also made of steel and inner tube member 58 and cap 64 are welded together as best seen in FIGS. 6 and 8b thereby forming a cylindrical channel 70 therebetween. The inner diameter of cylindrical portion 66 is slightly larger than the outer diameter of vertical leg 18 and the upper portion of vertical leg 18 is received within the channel 70. The upper annular surface or rim abuts 72 and slides on the annular surface 74 located on the cap and between the inner tube section 58 and the cylindrical portion 66. As can be appreciated, annular surfaces 72 and 74 are vertically bearing so as to transfer vertical forces downwardly from the cap 64 to the vertical leg 18. Grease and/or other lubricating oil can be placed within and between channel 70 for decreasing the friction between the components as the cap 64 and inner tube section 58 are rotated about the vertical axis 62 and over the vertical leg 18.

Figure 4:
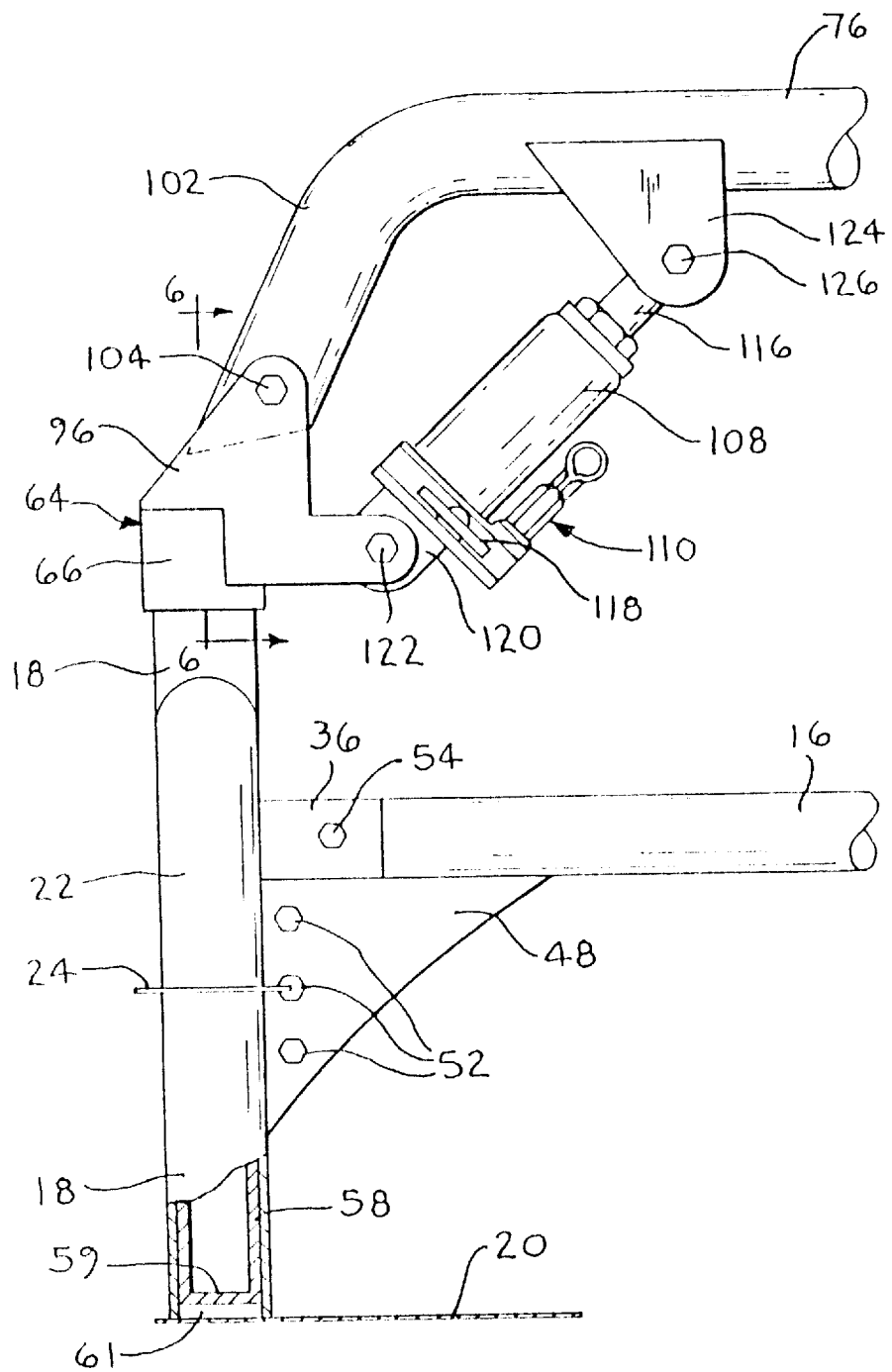
FIG. 4 is an enlarged partial rear elevation view of the roll bar and crane device shown in FIG. 3 and wherein the boom is adapted to be pivotable about the left leg member.

Alternatively and more preferably, the thrust or vertical downward forces and pivotal motion about vertical axis 62 is more easily accomplished with structure such as that shown at the bottom of vertical leg 18 in FIG. 4. Here, the inner tube section 58 is provided with a cap or an otherwise disk surface 59 at its lower end thereof. Below cap 59 there is provided a thrust bearing, washer or disk 61. Thrust bearing 61 can be made of Teflon or other similar structurally ridged low friction materials. Thrust bearing 61, in combination with the lower portion of inner tube section 58, thus allows the pivot member 56 to more easily and freely rotate about the vertical axis 62.

As more fully described hereinbelow, a crane boom 76 which also functions as the upper part of the roll bar is pivotally connected to the pivot member 56 and is rotatable along with pivot member 56 about vertical axis of rotation 62. In this regard, a locking mechanism generally designated by the numeral 78 is provided and functions to selectively lock the pivot member 56 and boom 76 in a plurality of distinct angular positions about vertical axis 62. Locking mechanism 78 includes a generally square channel 80 also made of steel and affixed to the vertical leg 18 by welding or other suitable means. Square channel 80 is open at its upper end and is closed at its lower end. Square channel 80 includes an elongate slot 82. A tongue member 84 is slidingly received within the square channel 80 and a compression spring 86 is located within and at the lower end of square channel 80 for biasing or pushing the tongue member 84 vertically upwardly. As best seen in FIG. 8a, compression spring 86 pushes tongue member 84 vertically upwardly and within one of a plurality of slots 87 located in the cylindrical portion 66 of cap 64.

As can be appreciated, when tongue member 84 is in its upper position as shown in FIGS. 8a and 8b and is received within a channel 87, rotation of the pivot member 56 and boom 76 about vertical axis 62 is effectively prevented. For allowing such pivotal motion, a threaded rod 88 is provided and is affixed to the tongue member 84 and extends out of the square channel 80 through the elongate slot 82. A knob 90 having a threaded bore is threadingly received on threaded rod 88 and is selectively threadingly turned for frictionally engaging and sandwiching the outer wall of square channel 80 between tongue member 84 and knob 90. As should now be evident, by first turning and loosening knob 90, the knob 90 and tongue member 84 can be pushed and forced downwardly against the force of compression spring 86 and out of the slots 87 of cylindrical portion 66. By turning and tightening knob 90 while tongue 84 is in its lowermost position, tongue 84 can be retained thereat and thereby allowing the pivot member 56 and boom 76 to freely rotate about the vertical axis of rotation 62. However, by turning and loosening knob 90 compression spring 86 again forces tongue member 84 upwardly and into one of the plurality of slots 87 thereby again stopping or limiting pivotal motion of the pivot member 56 and boom 76 about the vertical axis of rotation.

As best seen in FIG. 2, at the lower end of inner tube section 58, a horizontal slot 92 is provided and is adapted to receive a bolt 94 therethrough after inner tube member 58 has been fully inserted within the vertical leg 18. A threaded hole (not shown) is located through vertical leg 18 which is aligned with horizontal slot 92 when inner tube member 58 is fully inserted into vertical leg 18. Bolt 94 is threadingly received through the threaded hole of vertical leg 18 and extends through the horizontal slot 92 of inner tube section 58.

At the upper end of pivot member 56, a pair of gussets 96 are provided generally over cap 64. Gussets 96 are preferably made of plate steel material and are affixed to cap 64 by welding or other suitable means. For additional strength, gussets 96 are also affixed to the upper end of inner tube section 58 extending up and through the cap 64. In this regard, a pair of spacers 98 are located between each of the gussets 96 and the upper portion of inner tube member 58 and, preferably, gussets 96, spacers 98 and the upper end of inner tube member 58 are affixed to one another by welding or other suitable means. It is noted that spacers 98 are provided for locating gussets 96 apart from one another at a desired distance and different size spacers may be incorporated or the spacers themselves can be totally eliminated if desired.

The crane boom 76 is generally U-shaped and has an inner leg 100 and an outer leg 102. Crane boom 76 is also made of steel tubing material and is formed preferably by bending the steel tubing for forming the inner and outer legs 100 and 102. The end of inner leg 100 is partially located between gussets 96 and includes a hole which is aligned with holes at the upper end of gussets 96 and through which a bolt 104 extends. Bolt 104 is secured and is retained in place by a nut 106. As should now be evident, the crane boom 76 is pivotable about bolt 104 and about a horizontal axis of rotation 108.

The pivotal motion and the lifting of crane boom 76 is controlled by and accomplished via a hydraulic jack or cylinder 108 pivotally connected between the upper portion of pivot member 56 and crane boom 76. Hydraulic jack 108 includes a fluid pumping mechanism 110 including a pump handle receiving cylinder 112, a pressure release valve control port 114, and a cylinder 116 which is selectively extendable and retractable. A pump handle (not shown) is received in a known and customary manner within pump handle receiving cylinder 112 and is selectively oscillated for pumping the hydraulic jack 108 and causing the cylinder 116 to be extended. A valve control handle 118 is received in and coupled with the valve control port 114 in a manner whereby the turning of handle 118 selectively releases the pressure within hydraulic jack 108 and causes the cylinder 116 to be retracted.

The base 120 of hydraulic jack 108 is located between a portion of the gussets 96 and is provided with a hole which is aligned with holes in the gussets 96 and which receive therethrough a nut and bolt combination 122. Accordingly, hydraulic jack 108 may pivot about the nut and bolt combination 122. At the other end of hydraulic jack 108, cylinder 116 is pivotally connected to lift gussets 124 through the use of a nut and bolt combination 126. Lift gussets 124 are generally triangularly shaped are preferably made of plate steel and are affixed to the crane boom 76 by welding or other suitable means. In this regard, the upper part of cylinder 116 is provided with a hole which is aligned with holes located on the lift gussets 124 and the nut and bolt combination 126 is received therethrough for securing and allowing pivotal motion between cylinder 116 and lift gussets 124.

Figure 16:
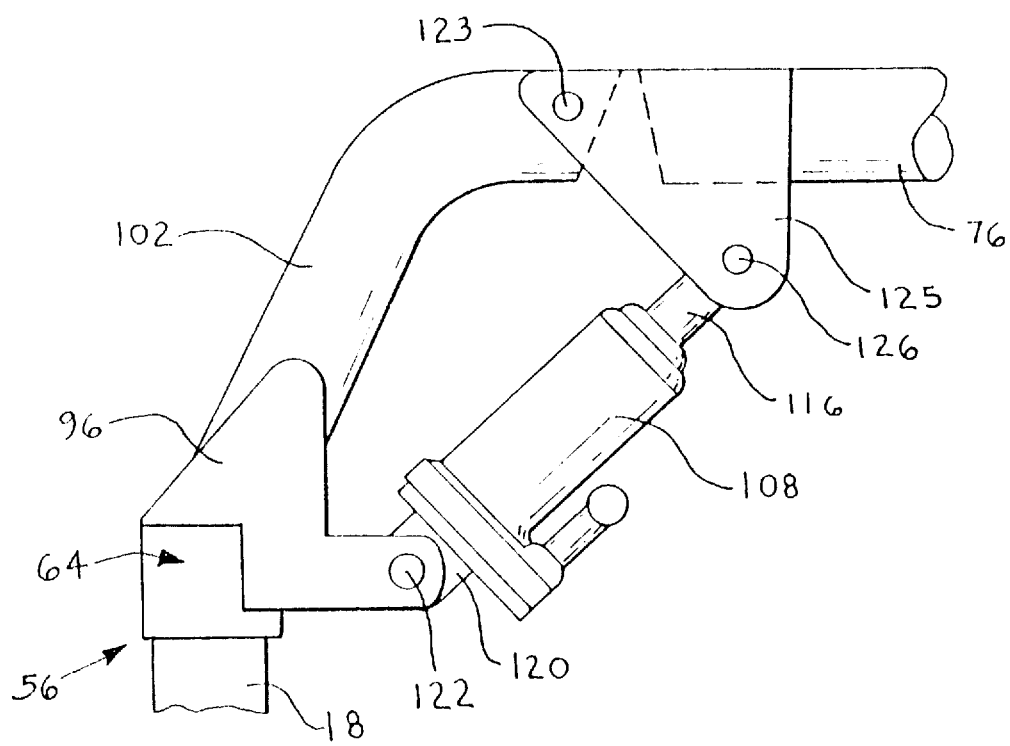
FIG. 16 is a side elevation view of yet another embodiment of a roll bar and crane device constructed in accordance with the principles of the present invention.

In yet another alternative preferred embodiment, as shown in FIG. 16, the horizontal axis of rotation is located on the crane boom 76. In this embodiment, the pivot member 56 is constructed with one of the boom legs, here the outer leg 102, directly affixed to the gussets 96. Outer leg 102 is affixed to both gussets 96 and cap 64 by welding or other suitable means. At its upper end the outer leg 102 is cut away from the crane boom 76 and pivot gussets 125 are provided on both sides of the outer leg 102 and crane boom 76. Pivot gussets 125 are affixed to the crane boom 76 by welding or other suitable means. Pivot gussets 125 are also pivotally connected to the hydraulic cylinder 116 via nut and bolt combination 126 and are also pivotally connected to outer leg 102 via a nut and bolt combination 123. As can be appreciated, in this embodiment the pivot member 56 is effectively lengthened and the horizontal axis of rotation of the crane boom 76 extends coaxially through the nut and bolt combination 123. Thus, by selectively extending or retracting the cylinder 116 of hydraulic jack 108, crane boom 76 is selectively pivoted about nut and bolt combination 123.

The outer leg 102 of the crane boom 76 is provided with an eyelet 128 which is received within the vertical leg 18 of the left leg member 12 whenever the crane boom 76 is placed in its roll bar position as shown in FIG. 1. Additionally, the outer leg 102 of crane boom 76 is selectively secured to the vertical leg 18 of left leg member 12 by a toggle latch 103.

From the foregoing, it should now be evident that crane boom 76 can be placed in a roll bar position as shown in FIG. 1 or, in the alternative, the outer leg 102 can be detached from the left leg member 12 for using the crane boom 76 for lifting objects as may be needed or desired. The crane boom 76 can be placed in various different positions as may be needed and the versatility and some of the various positions are depicted and shown in FIGS. 9 and 10 in dash lines.

Referring now to FIGS. 2, 11 and 12 a winch 130 is provided and is located and mounted either on the crane boom 76 or the central beam 16. Winch 130 is preferably operated by an electric motor although is it also contemplated that hand operated winches can also be used. The winch 130 is affixed to the central beam 16 or crane boom 76 by welding, bolts, and/or with other suitable means. Winch 130 includes a rope or steel cable 132 which is extendable and selectively retractable in a known and customary manner. As shown in FIG. 11, the rope or steel cable 132 can be extended and used while the roll bar and crane device 10 is in its roll bar position. In the alternative, while the roll bar and crane 10 is used as a crane, the rope or steel cable 132 can be extended through eyelet 128 for pulling and lifting objects such as a log 134.

So as to provide a more aesthetically pleasing roll bar and crane device and provide for greater safety during operation of the device as a crane, as shown in FIGS. 1 and 2, there are provided left and right covers 136 and 138. Covers 136 and 138 are shaped generally as mirror images of one another and having curveliner outer portion 140 having a shape quite similar that of crane boom 76 near its respective inner and outer legs 100 and 102. Covers 136 and 138 also include an inner arm portion 142. An opening 144 is provided and is located between the curvelinear outer portions 140 and the inner arm portions 142. Left and right covers 136 and 138 are made of wood, polyurethane, plastic or other suitable materials and are affixed to one side of the roll bar and crane 76 as best shown in FIG. 1. The covers 136 and 138 are affixed by fasteners such as screws, adhesives and/or other suitable means. The inner arm portion 142 of right cover 138 functions to generally cover or disguise the hydraulic jack 108 from plain view while the inner arm portion 142 of the left cover 136 functions only for aesthetics with respect to the overall appearance of the roll bar and crane device 10.

The inner arm portion 142 of the right cover 138 is also provided with a slot 146 wherethrough the valve control handle 118 extends for innerconnection within the valve control port 114. It is noted that the pump handle (not shown) is also inserted through the slot 146 when placing within the pump handle receiving cylinder 112 of the hydraulic jack 108. The slot 146 is located and is sized so that the pump handle and the valve control handle 118 extend through the slot 146 and move therein relative to the motion of cover 138 as the cylinder 116 is extended and retracted. In the alternative, hydraulic jack 108 can be provided with the fluid pumping mechanism 110 and the pump handle receiving cylinder 112 on the opposite side of the hydraulic jack 108 shown in FIG. 2. In such an embodiment, only the valve control handle 118 extends through the slot 146 and the pump handle is inserted into the pump handle receiving cylinder 112 through the cover opening 144. This embodiment is best seen in FIG. 1 where the pump handle receiving cylinder 112 is slightly visible through the cover opening 144.

An additional cover member 148, also made of the same materials as the covers 136 and 138, is also provided but is generally kidney shaped. Cover 148 is affixed to the upper portion of pivot member 56, namely, to one of the gusset members 96 or cap 64 with fasteners such as screws, adhesives and/or other suitable means. Thus, cover 148 remains stationary while cover 138 and boom 76 may be pivoted.

Figure 13:
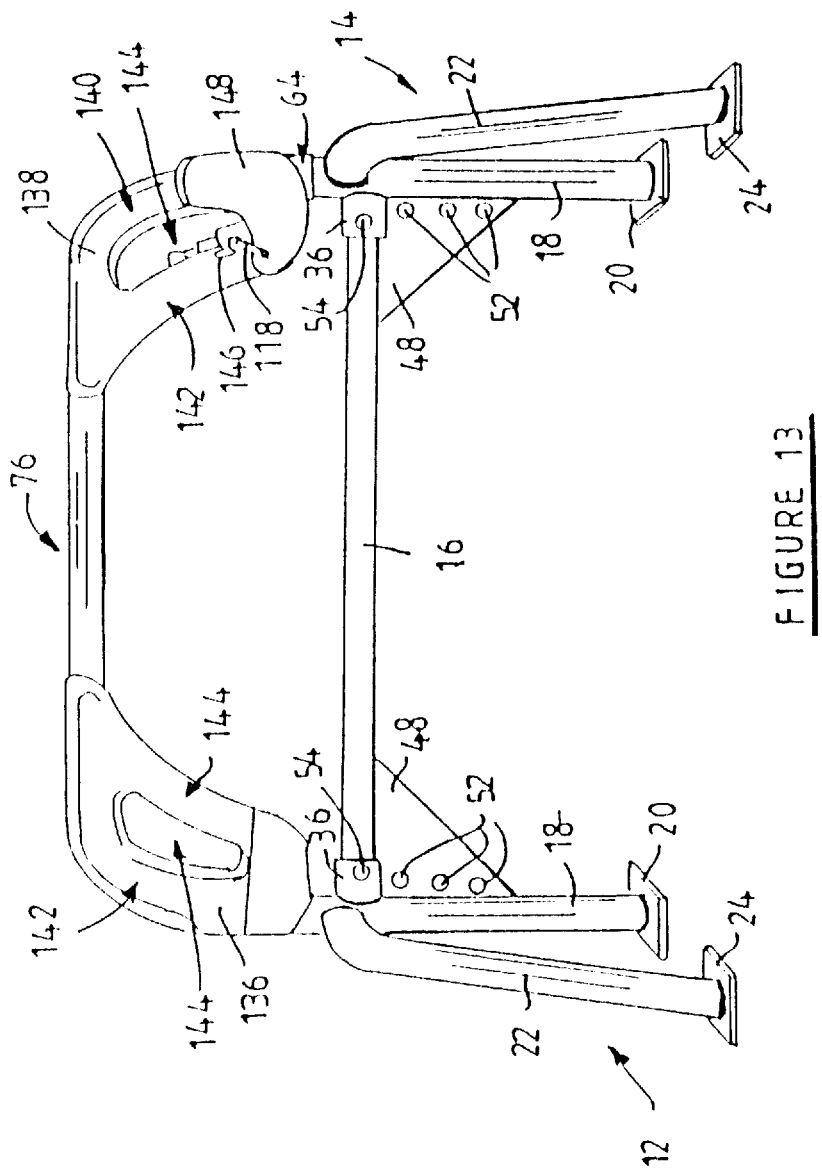
FIG. 13 is a rear elevation view of a roll bar and crane device similar to that of FIG. 1 but incorporating slightly different leg members and covers sandwiching the left and right legs of the U-shaped boom member.
Figure 14:
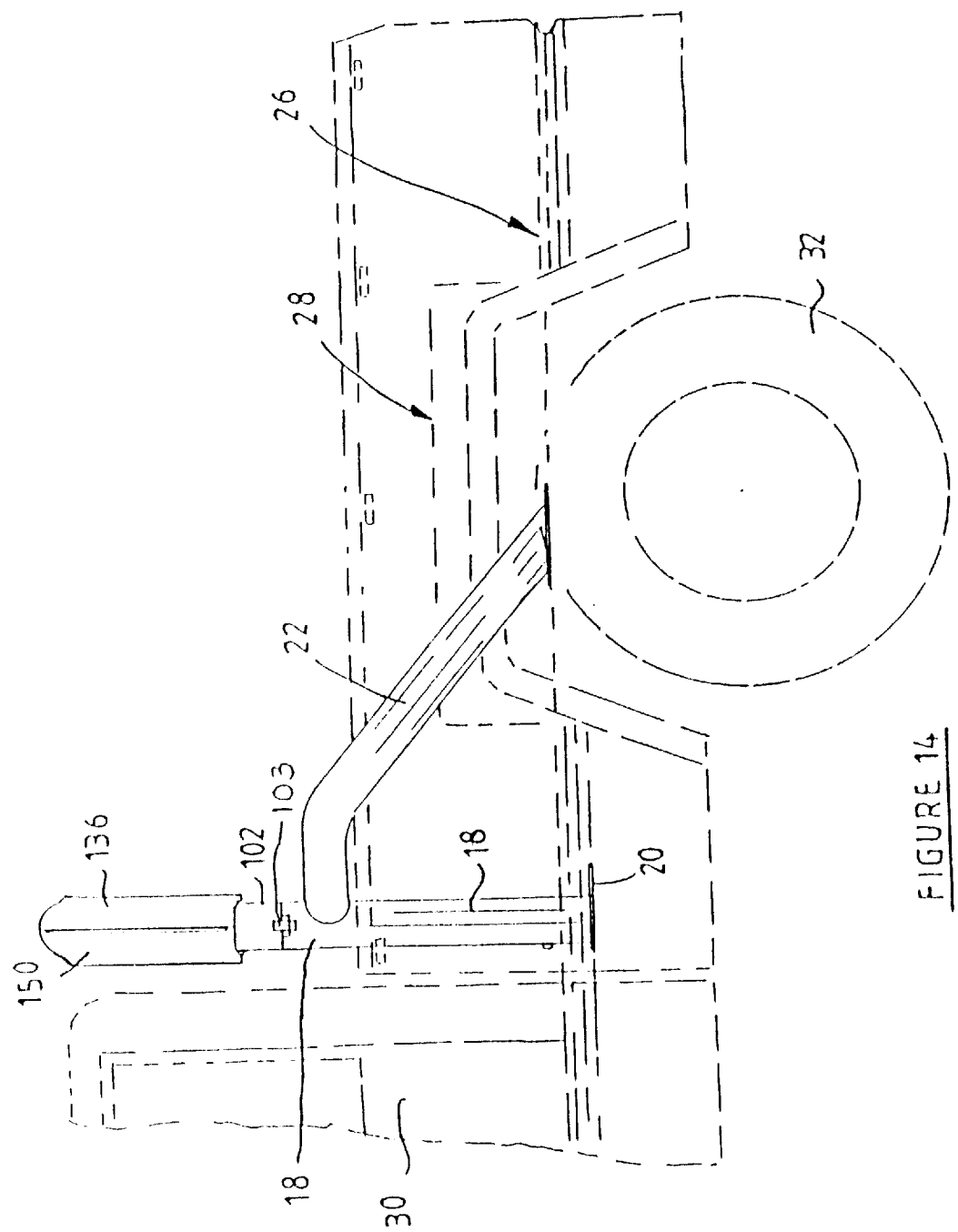
FIG. 14 is a side elevation view of the roll bar and crane device shown in FIG. 13 and showing the front and rear cover members sandwiching and covering a portion of the boom.
Figure 15:
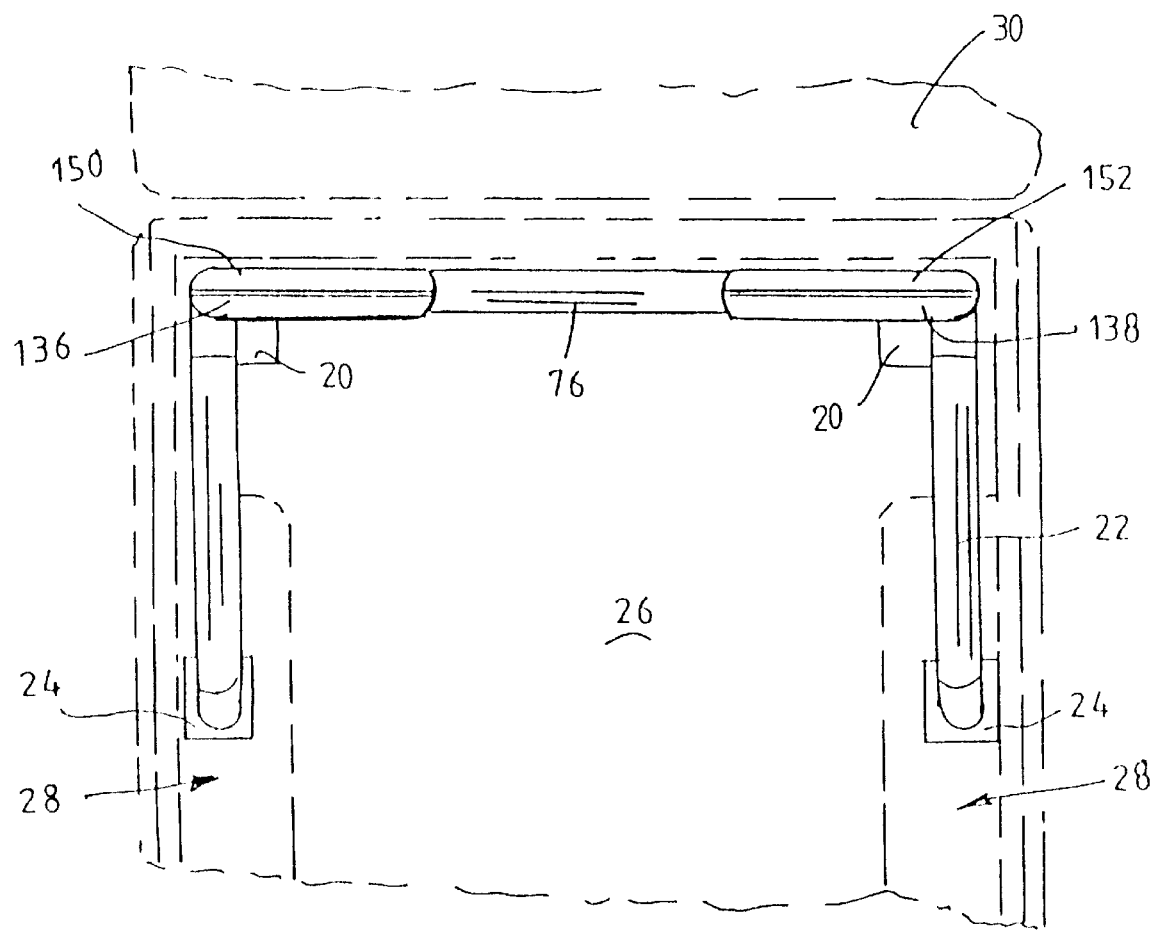
FIG. 15 is a top plan view of the roll bar and crane device shown in FIGS. 13 and 14.

In an alternative embodiment as shown in FIGS. 13, 14 and 15, a left forward cover 150 is provided on the other side of crane boom 76 and the left cover 136. Similarly, a right forward cover 152 is provided on the other side of crane boom 76 and the right cover 138. Left forward cover 150 is essentially a mirror image of left cover 136 and right forward cover 152 is essentially a mirror image of right cover 138. In this embodiment, however, covers 136, 138, 150 and 152 are most preferably made of plastic by injection molding or vacuum forming and/or forming of polyurethane. When assembled to the crane boom 76, covers 136 and 150 sandwich and enclose at least a part of the outer leg 102, and covers 138 and 152 sandwich and enclose at least a portion of the inner leg 100. Here, the covers are affixed to the crane boom 76 and/or the opposing cover members with fasteners such as screws, adhesives and other suitable means.

Finally, it is noted that the overall shape of the crane boom 76 and the covers 136, 138, 150 and 152 are shaped as generally shown, similar to, and at least somewhat smaller than the vehicle cab on the left and right thereof.

Figure 9:
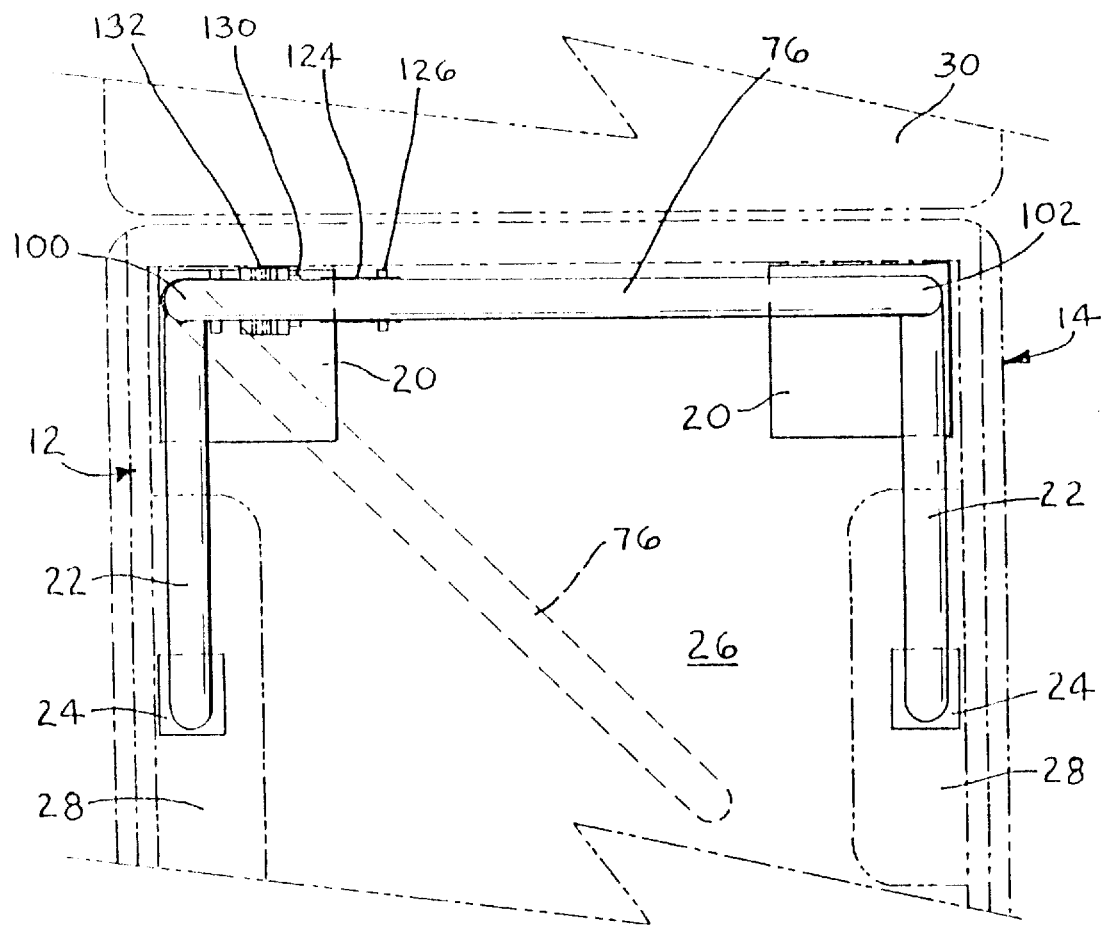
FIG. 9 is a top plan view of the roll bar and crane device shown in FIG. 3 and showing possible motion of the crane about the vertical axis in single dash lines and a vehicle upon which the device may be mounted in double-single dash lines.
Figure 10:
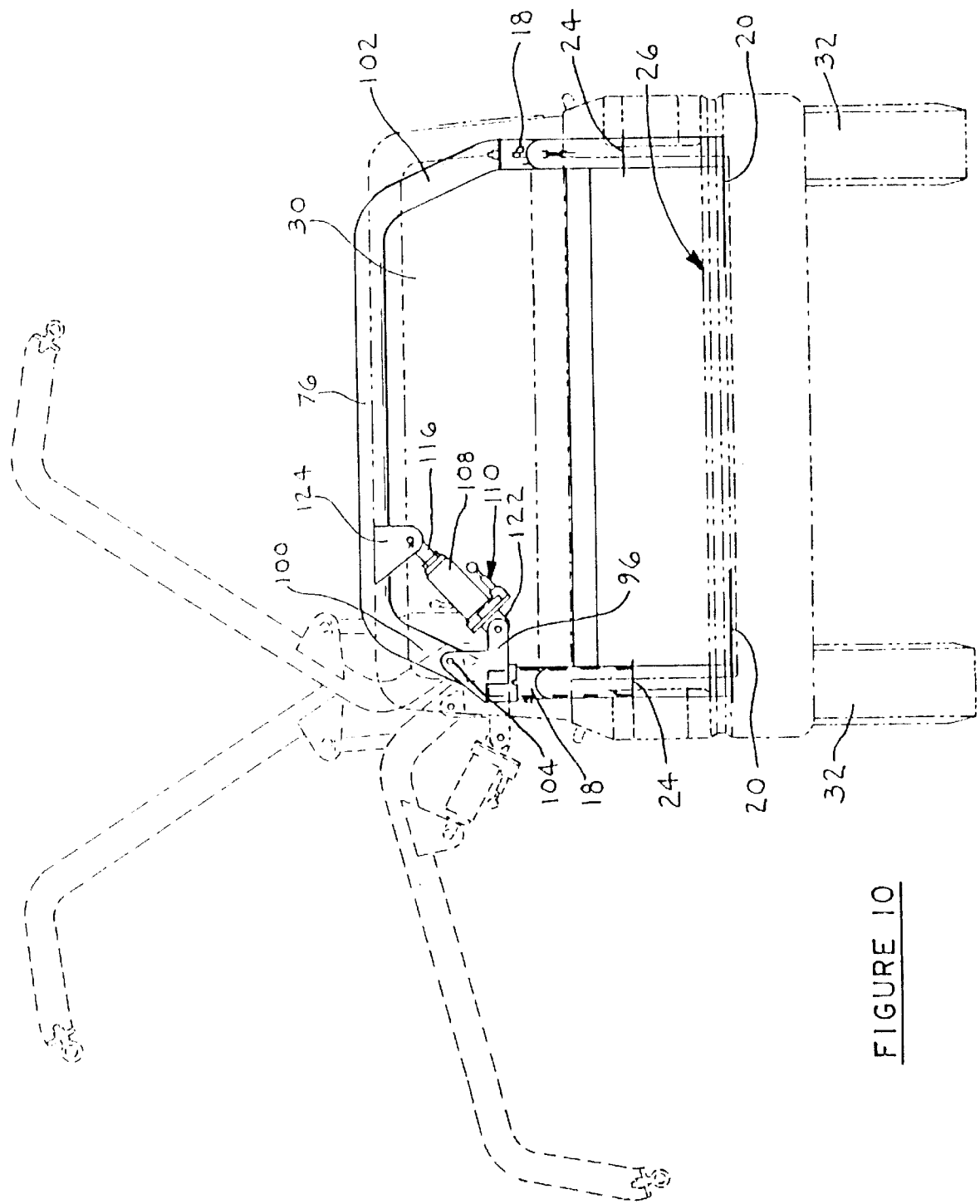
FIG. 10 is a rear elevation view of the device shown in FIG. 9 and showing the boom movable in various different positions in dash lines and a vehicle upon which the device may be mounted in double-single dash lines.

In FIG. 9 there are depicted pads 20 at the lower end of vertical legs 18 of a substantially larger size. These pads 20 provide a greater surface area and distribute the forces of the roll bar and crane device 10 over a larger surface area of the vehicle bed 26.

While the invention has been described as having specific embodiments, it will be understood that it is capable of further modifications. This application is therefore, intended to cover any variations, uses, or adaptations of the invention following the present disclosure as come within known or customary practice in the art to which this invention pertains and fall within the limits of the appended claims.

What is claimed is:

1. A roll bar and crane device comprising:
    a right leg member selectively attachable to one side defined by a vehicle;
    a left leg member selectively attachable to the other side defined by the vehicle;
    a central beam extending between said left and right leg members;
    said central beam being selectively detachably attachable to each of said left and right leg members;
    a boom defining opposite ends;
    wherein said boom at one end thereof is pivotally attached to one of said left or right leg members and at its other end is selectively detachably attachable to the other of said left or right leg members, whereby said boom is selectively pivotable about both a vertical axis of rotation and a horizontal axis of rotation for allowing the device to operate as a crane when the releasable end of the boom is detached from the one leg member and to allow the device to act as a roll bar when said releasable end is attached to the said leg causing the boom to extend transversely across the vehicle from one leg member to the other;
    wherein said central beam includes a left and a right end, said left end being selectively receivable in a cylindrical connecting sleeve located on said left leg member and said central beam right end being selectively receivable in a cylindrical connecting sleeve located on said right leg member; and,
    a brace member between each of the leg members and the central beam for detachably attaching the leg members to the central beam.

2. The roll bar and crane device of claim 1, wherein the brace members are located on said central beam on each of said left and right ends and further including leg attachment plates on each of said left and right leg members, wherein when said central beam is attached to said respective left and right leg members said central beam left brace member is located adjacent said left leg attachment plate and said central beam right brace member is located adjacent said right leg attachment plate.

3. The roll bar and crane device of claim 1, wherein at each said left and right leg cylindrical connecting sleeves a bolt extends through aligned holes in said cylindrical connecting sleeves and said respective central beam ends.

4. The roll bar and crane device of claim 2, wherein at each of said left and right adjacent brace members and attachment plates, a bolt extends through aligned holes in said brace members and said attachment plates.

5. The roll bar and crane device of claim 1, further comprising a pivot member having a portion pivotally coupled to one of said left or right leg members and adapted to pivot about said vertical axis of rotation, said boom being pivotally coupled to said pivot member.

6. The roll bar and crane device of claim 5, wherein said pivot member includes an elongate section longitudinally received in a vertical tube located on said left or right leg members, said elongate section being rotatable in said vertical tube.

7. The roll bar and crane device of claim 6, further comprising a cap at one end of said elongate section, said cap including an annular surface bearing against an annular rim on said vertical tube.

8. The roll bar and crane device of claim 7, wherein said cap further includes a cylindrical portion, said cylindrical portion being coaxial with said elongate section and forming a cylindrical channel therebetween, at least a portion of said vertical tube being received in said cylindrical channel and being sandwiched between said cap cylindrical portion and said pivot member elongate section.

9. The roll bar and crane device of claim 7, further comprising a pair of gussets affixed to said cap, said boom being pivotally coupled to said gussets.

10. A roll bar and crane device comprising:

a right leg member selectively attachable to a vehicle;

a left leg member selectively attachable to the vehicle;

a central beam extending between said left and right leg members;

a U-shaped boom;

a pivot member having a portion pivotally coupled to one of said left or right leg members and adapted to pivot about a vertical axis of rotation, said boom being pivotally coupled to said pivot member for pivotal motion about a horizontal axis of rotation;

wherein, in a roll bar position said boom extends over said left and right leg member and wherein said boom is selectively pivotable about both said vertical axis of rotating and said horizontal axis of rotation for operating as a crane;

wherein said pivot member includes an elongate section longitudinally received in a vertical tube located on said left or right leg members, said elongate section being rotatable in said vertical tube;

a cap at one end of said elongate section said cap including an annular surface bearing against an annular rim on said vertical tube; and, wherein said cap further includes a cylindrical portion said cylindrical portion being coaxial with said elongate section and forming a cylindrical channel therebetween at least a portion of said vertical tube being received in said cylindrical channel and being sandwiched between said cap cylindrical portion and said pivot member elongate section.

11. The roll bar and crane device of claim 10, further comprising a pair of gussets affixed to said cap, said boom being pivotally coupled to said gussets.

12. A roll bar and crane device comprising:

a right leg member selectively attachable to one side defined by a vehicle;

a left leg member selectively attachable to other side defined by the vehicle;

a central beam extending between said left and right leg members;

said central beam being selectively detachably attachable to each of said left and right leg members;

a boom defining opposite ends;

wherein said boom at one end thereof is pivotally attached to one of said left or right leg members and at its other end is selectively detachably attachable to the other of said left or right leg members, whereby said boom is selectively pivotable about both a vertical axis of rotation and a horizontal axis of rotation for allowing the device to operate as a crane when the releasable end of the boom is detached from the one leg member, and to allow the device to act as a roll bar when said releasable end is attached to the said leg causing the boom to extend transversely across the vehicle from one leg member to the other;

a pivot member having a portion pivotally coupled to one of said left or right leg members and adapted to pivot about a vertical axis of rotation, said boom being pivotably coupled to said pivot member for pivotable motion about a horizontal axis of rotation;

wherein said pivot member includes an elongate section longitudinally received in a vertical tube forming one of said left or right kg members, said elongate section being rotatable in said vertical tube; and, wherein said pivot member elongate section includes an end having a surface bearing against a thrust bearing.

13. The roll bar and crane device of claim 12, wherein said surface is located at a lower end of said elongate section and is disk shaped and said thrust bearing is made of Teflon.

* * * * *

UNITED STATES PATENT AND TRADEMARK OFFICE
CERTIFICATE OF CORRECTION

PATENT NO. : 5,848,715
DATED : December 15, 1998
INVENTOR(S) : Malcolm Duncan It is certified that error appears in the above-identified patent and that said Letters Patent is hereby corrected as shown below:

```
Col. 3, line 36, change "tear" to --rear--.
Col. 12, line 47, change "kg" to --leg--.
```

Signed and Sealed this

Thirtieth Day of March, 1999

Attest:

Q. TODD DICKINSON

*Attesting Officer*     *Acting Commissioner of Patents and Trademarks*